H. M. LOFTON.
METER BOX.
APPLICATION FILED APR. 5, 1911. RENEWED MAR. 4, 1914.
1,107,532. Patented Aug. 18, 1914.
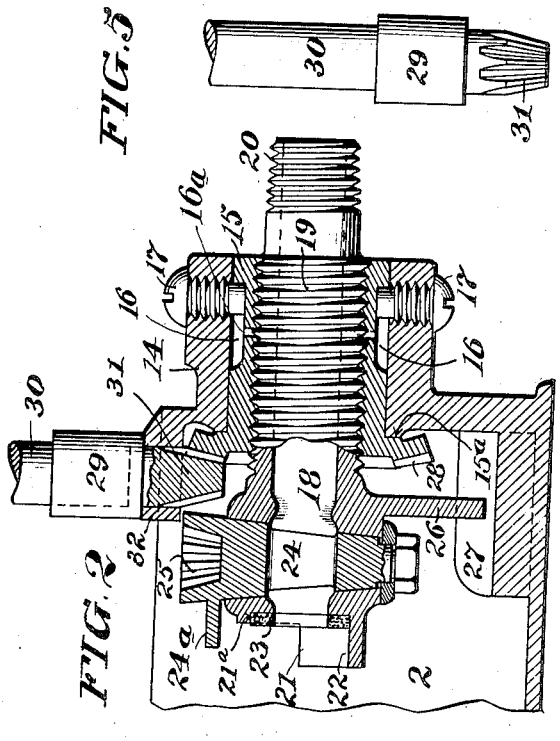
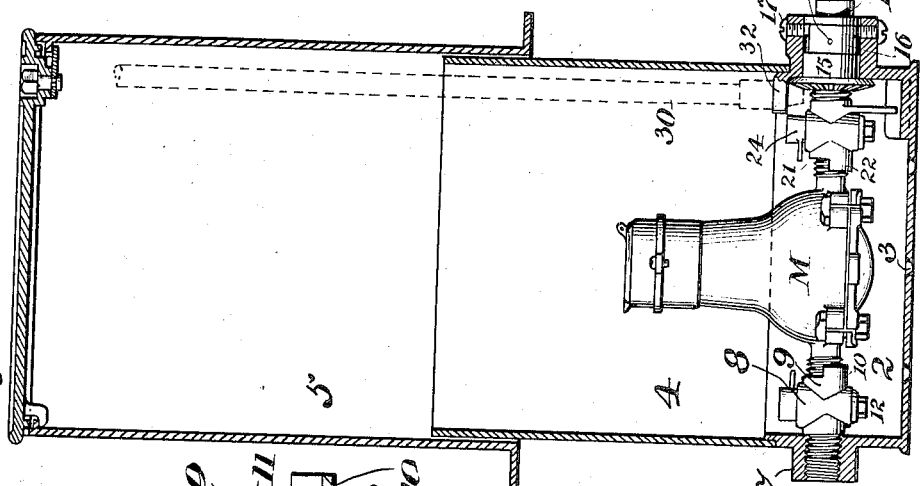
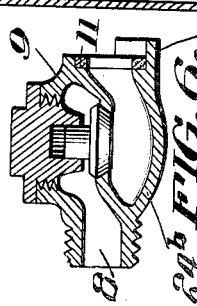
Witnesses.
Daniel Webster, Jr.
P. M. Kelly
Inventor
Herbert M. Lofton
By
Attorney

UNITED STATES PATENT OFFICE.

HERBERT M. LOFTON, OF CHATTANOOGA, TENNESSEE.

METER-BOX.

1,107,532.  Specification of Letters Patent.  Patented Aug. 18, 1914.

Application filed April 5, 1911, Serial No. 619,000.  Renewed March 4, 1914.  Serial No. 822,476.

*To all whom it may concern:*

Be it known that I, HERBERT M. LOFTON, a citizen of the United States, resident of Chattanooga, county of Hamilton, and State of Tennessee, have invented an Improvement in Meter-Boxes, of which the following is a specification.

My invention has reference to improvements in meter boxes and consists of certain improvements which are fully set forth in the following specification and shown in the accompanying drawings which form a part thereof.

The object of my invention is to provide a suitable construction of meter box adapted for inserting or removing the meter in relation to the inlet and outlet terminals of the piping, by adjustments which may be performed from the street and without the necessity of digging up the same.

More particularly my improvements relate to the means for clamping the meter in position and for controlling the flow of the water when the meter itself has been removed.

My invention consists in providing a meter box extending from the pavement to the desired depth with an inlet and an outlet combined with socket portions between which the inlet and outlet of the meter are clamped, the said socket portions being relatively adjustable and operable from the street by the employment of a suitable key, and said inlet and outlet portions of the meter box being provided with valve devices for controlling the flow of water should it be desired to remove the meter, and my invention consists in certain improvements embodying such features, the same being illustrated in the drawings, more fully described hereinafter and more particularly defined in the claims.

Referring to the drawings, Figure 1 is a sectional elevation of a meter box embodying my improvements; Fig. 2 is a sectional elevation of the inlet port and socket mechanism of the meter box on a larger scale; Fig. 3 is a corresponding sectional elevation of the outlet and socket of the meter box made on a scale corresponding to that of Fig. 2; Fig. 4 is an elevation with part in section of a modified form of my invention as applied to the inlet side of the meter box; Fig. 4ᵃ is an elevation of the guide shown in Fig. 4; Fig. 5 is an elevation illustrating one form of a key adapted for use in adjusting the parts of my improved meter box; and Fig. 6 is a sectional view of a modification of the outlet valved socket.

2 is the base of the meter box and may be provided with drainage apertures 3. Fitted above this base 2 is an upwardly extending tubular part 4 and arranged above the tubular part 4 is an upper telescoping tubular part 5 which is provided at the extreme top with the removable cover portion 6 which is supposed to be on a level with the surface of the street. The parts 4 and 5 are extensible so that the cover portion may be arranged on the surface, irrespective of the variable distances at which the meter may be required to be placed to suit the location of the pipes.

The base 2 is provided with the outlet screw threaded boss 7 for connection with the pipe leading into the house. Into this screw threaded boss is screwed a socket body 8 having a valve piece 12 to control the flow of water through it, said valve piece having at the top a recessed portion 13 formed with tapered teeth and adapted to receive the lower end of a key 30 having beveled teeth 31 very similar to a beveled pinion and which is adapted to fit into the socket portion 13 for turning the valve piece 12 when desired. This boss and socket body provide the base with a water passage, and said passage is furnished with the valve piece. The body 8 is further provided on its end with a socket 9 formed by having the lower portion made with a semicircular flange 10 and having the aperture for the passage of the water furnished with an annular packing 11, as is clearly shown in Fig. 3. This construction constitutes a modified form of stop-cock, especially adapted to my improved meter box.

Referring now to the construction on the inlet side and adapted to receive water from the street main, I provide an adjustable coupling between the water pipe in the street and the inlet side of the meter, the details of which are clearly shown in Fig. 2.

18 is the tubular coupling portion and is screw threaded on its middle portion at 19, said screw threads working in a bushing 15 rotatably journaled in the bearing 14 on the base of the meter box. The extreme outer end of the coupling part 18 is screw threaded at 20 for connection with the intake water pipe, and at its opposite end, it is provided with the stop-cock 24 having the recessed and ribbed socket 25 at the top corresponding to the part 13 in the stop-cock 12 previously described. The end of the coupling piece 18 is formed into a socket portion 21 having the counterbored part 21ª furnished with the annular packing or gasket 23 and the semicircular flange 22 projecting around the lower part. The socket portions 9 and 21 are similar in construction and oppositely directed and receive between them the meter indicated at M in Fig. 1, the inlet port of the meter being received in the socket 21 of the coupling piece and the outlet port in the socket 9 of the discharge port of the meter box. It will be understood that by rotating the bushing 15 the coupling part 18 will be moved longitudinally and in this manner have its socket portion 21 moved to or from the socket portion 9 for the purpose of clamping or releasing the meter.

The bushing 15 journaled in the part 14 of the base is provided with an annular groove 16 in which screws 17 extend for the purpose of holding the bushing in place within its bearing while permitting it to be rotated. Sufficient clearance space is provided by the annular groove 16 beyond what is necessary for the retaining screw 17, so as to provide an annular oil or grease chamber from which oil may also find access through the holes 16ª to the threaded portion 19 of the adjustable coupling. The inner end of this bushing 15 is provided with a shoulder 15ª working against the end of the bearing and also furnished with a beveled gear 28 by which the bushing may be rotated when the key 30 is made to engage the bevel gear 28 to rotate it. It will be seen from Fig. 5 that the lower end of this key 30 is provided with a collar 29 and immediately below with a beveled pinion 31, and by examining Fig. 2, it will be seen that the lower end of the key fits through a guide 32 which also supports the key through the collar 29 and when the parts are so adjusted the pinion 31 on the end of the key will be in engagement with the bevel gear 28. The rotation of the key when in this position will rotate the bushing and as a result will move the coupling piece 18 longitudinally. This coupling piece is held against rotation by the downwardly extending lug 26 which works between suitable guides 27. In this manner the adjustable coupling may be moved toward or from the fixed coupling or socket 9 and the parts operated entirely from above. As before stated, the same key may be employed to turn either of the stop-cocks 12 or 24 and these stop-cocks may be provided with suitable projections or pointers 12ª and 24ª, respectively to indicate when said cocks are fully open. It will now be understood that when it is desired to remove the meter, the water in the pipes may be prevented from draining or discharging into the meter box by turning the said stop-cocks 12 and 24 to the off position before rotating the bushing for releasing the meter and reversely the meter may be placed and clamped in position before the stop-cocks are turned on. In placing the meter in position, its inlet and outlet portions rest in the semicircular parts 10 and 22, as indicated in Fig. 1 and which act as supports during the clamping action of the coupling piece.

It is obvious that the valve 12 might be a check valve 24ᵇ (Fig. 6) in place of a stop-cock, as the water is passed through this part always in one direction and must not flow in the opposite direction; but because of the fact that check valves are likely to be more or less leaky, I prefer to employ a positively operable stop-cock of the character shown. Furthermore, by having the stop-cocks provided with recessed upper portions for turning them by means of the beveled gear end of the key 30, there will be less likelihood of their being tampered with and moreover said construction enables the one key to be employed for all purposes of adjustment.

While I have shown my invention with the preferred beveled gear construction for rotating the bushing, I do not restrict myself to that particular way of securing the rotation, as the said bushing may be provided with a hexagonal portion 28ª as shown in Fig. 4 by which the bushing may be rotated with a suitable wrench.

While I have referred to the adjustable coupling part as being connected with the supply pipe so that it constitutes the inlet to the meter box and meter, whereas the outlet is fixed, it is evident that while this is the preferred way of using the apparatus the water may be passed through the meter box and meter in the reverse direction and hence I do not restrict myself to the direction of flow of water through the apparatus, although for conveniently describing the structure, I refer to the fixed socket as being connected with the outlet and the adjustable socket and coupling piece as being connected with the inlet.

While I have shown my invention in its preferred form, and have found the constructions illustrated excellently adapted for the commercial use of my invention, I do not restrict myself to the details, as these may be modified without departing from the spirit of my invention.

Having now described my invention what I claim as new and desire to secure by Letters Patent is:—

1. In a meter box, the combination of a box structure having a water passage and socket for the meter said passage being provided with a valve, an adjustable coupling portion providing a second passage for water and furnished with a socket portion for the meter and also having a stop-cock movable with the coupling portion, and means for adjusting the coupling portion together with its stop-cock and socket longitudinally.

2. In a meter box, the combination of a box structure having a water passage and socket for the meter said passage being provided with a valve, an adjustable coupling portion providing a second passage for water and furnished with a socket portion for the meter and also having a stop-cock movable with the coupling portion, and means for adjusting the coupling portion together with its stop-cock and socket longitudinally consisting of a rotatable bushing journaled in the meter box with provision for rotation without longitudinal movement.

3. A meter box structure having an outlet provided with a meter supporting socket and stop cock, combined with an inlet having a coupling portion relatively movable to or from the outlet and provided with a meter supporting socket and a stop-cock adjacent to said socket, said stop cock movable with the coupling portion.

4. In a meter box structure, a casing having a port provided with a fixed socket piece for receiving one port of the meter, and also having a tubular bearing adjustable socket portion for receiving the other port of the meter and provided with a screw threaded coupling portion through which water flows, and a rotatable bushing journaled in the tubular bearing of the casing and held against longitudinal movement said bushing surrounding the said coupling part and engaging its screw thread whereby the rotation of the bushing will adjust the coupling part longitudinally for the purpose of clamping the meter between the two socket portions.

5. In a meter box structure, a casing, a port in said casing provided with a fixed socket piece for receiving one port of the meter, an adjustable socket portion for receiving the other port of the meter and provided with a screw threaded coupling portion through which water flows, and a rotatable bushing journaled in the casing and held against longitudinal movement said bushing surrounding the said coupling part and engaging its screw thread and provided with a beveled gear, whereby the rotation of the bushing will adjust the coupling part longitudinally for the purpose of clamping the meter between the two socket portions, and a key having a beveled pinion upon its end for rotating the beveled gear and detachably journaled in the meter box casing.

6. In a meter box structure, a casing having a port provided with a fixed socket piece for receiving one port of the meter, and also having a tubular bearing, an adjustable socket portion for receiving the other port of the meter and provided with a screw threaded coupling portion through which water flows and also with a stop-cock, and a rotatable bushing journaled in the tubular bearing of the casing and held against longitudinal movement, said bushing surrounding the said coupling portion and engaging its screw thread whereby the rotation of the bushing will adjust the coupling portion together with its stop cock longitudinally for the purpose of clamping the meter between the two socket portions.

7. In a meter box, an adjustable coupling for making connection with the meter consisting of a screw threaded tubular part having at one end a socket for clamping the meter and adapted at the other end for connection with the water supply pipe and provided further with a screw threaded body, combined with a bushing journaled in the meter box and surrounding the screw threaded body of the coupling piece and provided with an annular groove portion constituting an oil chamber, means extending into the oil chamber for holding the bushing in place against longitudinal motion while permitting of its rotation, and means for rotating the bushing.

8. In a meter box, an adjustable coupling for making connection with the meter consisting of a screw threaded tubular part having at one end a socket for clamping the meter and adapted at the other end for connection with the water supply pipe and provided further with a screw threaded body and a stop-cock between the screw threaded body and the socket portions thereof, combined with a bushing journaled in the meter box and surrounding the screw threaded body of the coupling piece and provided with an annular groove portion constituting an oil chamber, means extending into the oil chamber for holding the bushing in place against longitudinal motion while permitting of its rotation, and means for rotating the bushing.

9. In a meter box, the combination of a casing provided with an outlet having a socket portion for the outlet of the meter, and a tubular bearing opposite the outlet and a coupling structure for connecting the and a supply pipe with the inlet of the meter said coupling structure comprising a screw threaded tubular part having at one end a socket portion for connection with the meter and a valve in said tubular part for controlling the passage therein, and a bushing screwed upon the tubular part and journaled in the tubular bearing in the meter box casing, said bushing having an annular recess forming with the bearing a lubricant chamber, the construction being such that the rotation of the bushing imparts a longitudinal motion to the tubular part together with its socket and valve for clamping or releasing the meter.

10. In a meter box, an outlet therefrom having a stationary socket piece for the meter, combined with a longitudinally adjustable tubular part having a valve and socket part for clamping the meter, said valve having its top formed with a key socket, a bushing journaled in the casing and forming a screw threaded connection with the tubular part and also having a beveled gear by which to rotate the bushing, and a key having its end provided with a beveled pinion adapted to engage the beveled gear and also the socket recess in the valve whereby either the gear or the valve may be rotated with the same key.

In testimony of which invention, I hereunto set my hand.

HERBERT M. LOFTON.

Witnesses:
P. J. CRIMMINS,
W. J. DODGE.